Dec. 8, 1925.
M. CANTRELL
SILICA BRICK PALLET CLEANER
Filed Nov. 15, 1924
1,564,199
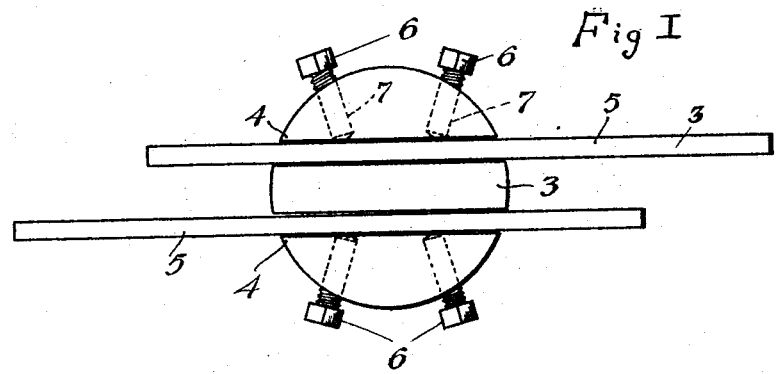
Fig I
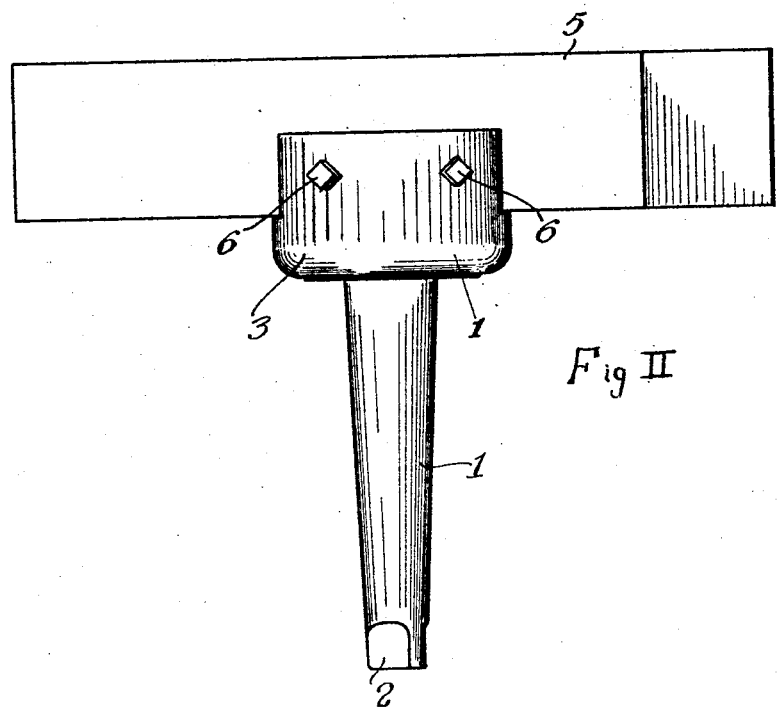
Fig II
Inventor
Manel Cantrell Patented Dec. 8, 1925.

1,564,199

UNITED STATES PATENT OFFICE.

MANCE CANTRELL, OF EAST CHICAGO, INDIANA.

SILICA-BRICK PALLET CLEANER.

Application filed November 15, 1924. Serial No. 750,030.

*To all whom it may concern:*

Be it known that I, MANCE CANTRELL, a citizen of the United States, residing at East Chicago, in the county of Lake and State of Indiana, have invented certain new and useful Improvements in Silica-Brick Pallet Cleaners; and I do hereby declare the following to be a full, clear, and exact description of the invention, such as will enable others skilled in the art to which it appertains to make and use the same.

This invention relates to a novel tool device and more particularly to a cleaner for pallets used in connection with the manufacture of silica brick.

In the manufacture of brick, particularly of silica or the like, a pallet is employed for separating and holding the bricks until they have been hardened and set, after being formed or molded, and the silica collects and hardens or coagulates on the pallets so that when used in the manufacture of the bricks, the latter are produced with resulting deformed or irregular shapes and rough surfaces or depressions, which of course, are objectionable.

The present invention is a cleaner or scraper for use in connection with a drilling machine or other form of rotary, oscillatory or reciprocatory machine like a drill, whereby the silica which collects on the pallet may be cleaned or removed therefrom as by scraping, in a quick and efficient manner.

Another object of the invention is to permit adjustment of the cleaner or scraper plates of the device.

With the above and other objects in view, the invention consists of certain novel combinations and arrangements of parts as will be hereinafter more fully set forth, described and claimed.

In the accompanying drawings:

Fig. 1 is a bottom plan view of my improved cleaner, and

Fig. 2 is a side elevation thereof.

Referring to the drawings in detail, it will be observed that the cleaner includes a shank 1 having the flattened, square or polygonal shaped end 2 adapted to be inserted in a drill chuck or the like, the same as any ordinary drill, for the purpose of gripping, supporting and actuating the present tool or cleaner. The shank 2 is provided with an enlarged head or body 3 preferably substantially cylindrical having a plurality, preferably two parallel slots 4 in the bottom thereof extending across the head 3 as chords of an arc of a circle and preferably equidistantly spaced from the center of the cylindrical head. Flat rigid plates 5 of steel or the like, with sharp corners and edges, are placed in the slots 4, as seen in the drawings, said plates being held by set screws or other binding means 6 engaged through threaded openings 7 in the cylindrical head 3 and extending through from the peripheral surface thereof.

It will be noted that the set screws 6 extend into the head at opposite angles to frictionally engage and bind the plates in the respective slots 4 so that the plates may be held parallel and co-extensive, or may be adjusted longitudinally or outwardly from this position as shown in full lines 1 Fig. 1, to the dotted line position, in which the plates are so related to have one end of each extend outwardly or beyond the corresponding end of the other to give a larger radius or sweep and thus secure the cleaning of the entire area of the pallet in quicker time. It is to be understood that when it is desired to adjust the cleaner plates 5, the set screws 6 are loosened and the plates adjusted, after which the set screws are tightened.

In the use of the cleaner, the shank is held in the chuck of a drill or the like, supported over the work table which carries the pallet covered with the collected silica. The tool is then brought down against the pallet by operation of the drill handle in presenting the drill to the work as usual, which brings the cleaner with the desired or firm pressure against the pallet. By operating the drill or other machine, either to cause, the cleaner to rotate continuously, oscillate or to reciprocate in any other form of machine for this purpose, while pressure is brought to bear upon the cleaner plates or knives against the silica collected upon the pallet, the latter will be thoroughly and quickly cleaned of this collection. The plates may also be adjusted as desired, and as will be noted, they project from the bottom surface of the cylindrical head 3, so that there is no possibility of engagement of the head of the cleaner with the pallet. This device eliminates the tedious operation of cleaning silica brick pallets by hand and insures that the bricks will be in proper shape and removed of all rough or irregular surfaces or depressions.

I wish to have it understood that I may make such changes in the form, arrangement and construction of the parts as do not depart from the spirit and scope of the invention.

Furthermore, it is to be understood that the plates are preferably provided with sharp square edges which substantially form knives or cutters in their action on the collected silica or other cementitious material on the plate. However, the action is also a scraping action. Moreover, the plates may be reversed in position when the cutting edges become worn or rounded.

I claim:

1. In a silica brick pallet cleaner, a shank, a head carried by one end thereof and provided with a plurality of parallel grooves, elongated scraping blades received in the grooves and having their ends projecting a relatively great distance beyond the head and disposed in overlapping relation, and fastening elements passing through the head at opposite sides thereof and engaging the blades to hold the same in position in the grooves and permitting the longitudinal adjustment of the same, the shank being adapted to be received in a rotary tool holder whereby to rotate the blades over the surface of the pallet to scrape silica therefrom.

2. A rotary scraping tool comprising a shank adapted to be held in a rotary tool holder, a head formed upon one end thereof and provided with a pair of parallel grooves, elongated scraper blades received in the grooves and having their outer longitudinal edges disposed beyond the outer face of the head, the head being provided with threaded openings at opposite sides thereof, and screws passing through the openings and engageable with the blades to hold the same in the grooves, and permitting the blades to be adjusted longitudinally, the blades being arranged with one end projecting beyond the other.

In testimony whereof I affix my signature.

MANCE CANTRELL.